United States Patent
Mandich et al.

(10) Patent No.: US 12,045,583 B2
(45) Date of Patent: *Jul. 23, 2024

(54) MULTI-SOURCE ENTROPY RANDOMNESS AGGREGATION AND DISTRIBUTION NETWORK

(71) Applicant: QRYPT, INC., New York, NY (US)

(72) Inventors: Denis Mandich, New York, NY (US); Christopher Knapp, New York, NY (US)

(73) Assignee: QRYPT, INC., New York, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 17/433,361

(22) PCT Filed: Aug. 30, 2019

(86) PCT No.: PCT/US2019/048950
§ 371 (c)(1),
(2) Date: Aug. 24, 2021

(87) PCT Pub. No.: WO2020/176131
PCT Pub. Date: Sep. 3, 2020

(65) Prior Publication Data
US 2022/0150051 A1 May 12, 2022

Related U.S. Application Data

(63) Continuation of application No. 16/288,722, filed on Feb. 28, 2019, now Pat. No. 10,402,172.

(51) Int. Cl.
*G06F 7/58* (2006.01)
*H04L 9/06* (2006.01)
*H04L 9/08* (2006.01)

(52) U.S. Cl.
CPC ............. *G06F 7/588* (2013.01); *G06F 7/58* (2013.01); *H04L 9/0662* (2013.01); *H04L 9/0858* (2013.01)

(58) Field of Classification Search
CPC ....... H04L 9/0662; H04L 9/0858; G06F 7/58; G06F 7/588
(Continued)

(56) References Cited

U.S. PATENT DOCUMENTS 5,778,069 A 7/1998 Thomlinson et al.
6,628,786 B1 9/2003 Dole
(Continued)

OTHER PUBLICATIONS

Office Action issued in KR Application No. 10-2021-7030575 dated May 3, 2023, with English translation.
(Continued)

*Primary Examiner* — Benjamin A Kaplan
(74) *Attorney, Agent, or Firm* — TROUTMAN PEPPER HAMILTON SANDERS LLP

(57) ABSTRACT

A software and hardware infrastructure is provided that can generate traceable and verifiably random number sequences provided from multiple random number sources, including quantum entropy sources, potentially located at multiple points of origin, and distribute the verifiable number sequences across multiple channels and protocols to multiple ultimate destinations in a distributed computing environment. Random number sequences obtained from unique entropy sources can be tagged with information on the provenance and/or other details of the creation of each number sequence. Tags can be used to verify the reliability of each tagged number sequence and/or its associated source. Tags can also include a use indicator to avoid re-use of a tagged number sequence.

20 Claims, 7 Drawing Sheets

(58) Field of Classification Search
USPC .......................................................... 380/46
See application file for complete search history.

(56) References Cited

U.S. PATENT DOCUMENTS

| | | |
|---|---|---|
| 6,667,980 B1 | 12/2003 | Modi et al. |
| 6,826,186 B1 | 11/2004 | Dittia et al. |
| 6,871,206 B2 | 3/2005 | Henry et al. |
| 6,931,128 B2 | 8/2005 | Roberts |
| 7,190,696 B1 | 3/2007 | Manur et al. |
| 7,242,776 B1 | 7/2007 | Elliot |
| 7,304,999 B2 | 12/2007 | Sukonik et al. |
| 7,706,365 B2 | 4/2010 | Effros et al. |
| 8,190,666 B2 | 5/2012 | Suzuki et al. |
| 8,380,768 B2 | 2/2013 | Hoefler |
| 8,429,408 B2 | 4/2013 | Vanstone |
| 8,559,434 B2 | 10/2013 | Rothenberg et al. |
| 8,718,089 B2 | 5/2014 | Famolari |
| 8,750,309 B2 | 6/2014 | Ernstrom |
| 8,907,823 B2 | 12/2014 | Marpe et al. |
| 9,092,285 B2 | 7/2015 | Inglett et al. |
| 9,128,791 B1 | 9/2015 | Boppana |
| 9,479,127 B2 | 10/2016 | Kumagawa et al. |
| 9,507,566 B2 | 11/2016 | Payne et al. |
| 9,866,389 B2 | 1/2018 | Reed et al. |
| 10,140,095 B2 | 11/2018 | Dale et al. |
| 10,275,268 B2 * | 4/2019 | Krempa ............... G06F 9/45558 |
| 10,348,704 B2 * | 7/2019 | Figueira ............... H04L 63/0428 |
| 2008/0256151 A1 | 10/2008 | Acar et al. |
| 2016/0124716 A1 | 5/2016 | Venkata et al. |
| 2016/0342394 A1 | 11/2016 | Tsirkin |
| 2017/0168776 A1 | 6/2017 | Boenisch et al. |
| 2018/0300108 A1 | 10/2018 | Goldman et al. |
| 2021/0409207 A1 * | 12/2021 | Prokop ................ G06F 21/602 |

OTHER PUBLICATIONS

International Search Report issued in PCT/US2019/048950 dated Oct. 28, 2019.

* cited by examiner

MULTI-SOURCE ENTROPY RANDOMNESS AGGREGATION AND DISTRIBUTION NETWORK

CROSS REFERENCE TO RELATED APPLICATIONS

The present application is a U.S. National Phase Application under 35 U.S.C. § 371 of International Patent Application No. PCT/US2019/048950 filed Aug. 30, 2019, which is a continuation of U.S. patent application Ser. No. 16/288,722, filed Feb. 28, 2019, the entirety of which is incorporated herein by reference.

FIELD OF INVENTION

The present invention generally relates to random number generation and distribution, and more particularly, to generating random numbers from quantum entropy sources and distributing random numbers to an external computing network.

BACKGROUND

Many computerized applications such as encryption algorithms, scientific models, and analytical tools require random numbers. A traditional approach for generating random numbers involves using a software algorithm that is provided a seed input and generates so called "random" numbers by manipulating the seed input. The use of a non-random seed injects a starting bias into the algorithm. The complex processing used to manipulate the seed also imparts a bias, and the result is a number that is not truly random. The name given to the biased output of a random number generating software algorithm is "pseudo random number", hence these algorithms are more properly referred to as pseudo random number generators (PRNGs).

Since a pseudo random number has a bias, predicting its value, and the value of any quantity derived from it, is much easier than predicting the value of a truly random number. When pseudo random numbers are used to create encryption keys for computerized communications, the resulting key is easier to crack than a key generated from a truly random source. As advances continue to be made in mathematics and quantum computing, PRNGs are expected to become obsolete for many computer security applications. Additionally, when pseudo random numbers are used to validate scientific experiments, their bias can lead to errors.

Because of the shortcomings associated with PRNGs, it is preferable to use truly random numbers for applications requiring random numbers. A truly random number is one in which the present value is not dependent upon, nor related to, the value of any other number in the sequence; that is, the present value of the number is determined only by unbiased chance. If the value of the number is unbiased, then the likelihood that a particular number will appear will not change over time; in other words, it will always be unpredictable. Truly random numbers can be generated by sampling physical processes having fundamentally probabilistic behavior. Such physical processes come from a limited number of physical activities, or phenomena. Quantum entropy sources are desirable for random number generation, because unlike classical physics, quantum physics is fundamentally random. However, access to quantum entropy sources is currently limited. Further, single sources of entropy with a singular access channel can be vulnerable to exploitation, modification, and/or compromise of the output integrity.

There is therefore a need for systems, devices, and methods to provide widespread access to random number sequences generated based on probabilistic physical processes such as quantum entropy.

SUMMARY

It is an object of the present invention to provide systems, devices, and methods to meet the above-stated needs. Generally, it is an object of the present invention to provide a software and hardware infrastructure capable of generating random and pseudo-random number sequences generated from random number sources located at multiple points of origin and distributing the number sequences across multiple channels and protocols to multiple ultimate destinations in a distributed computing environment. In some examples, number sequences generated from multiple independent and unique hardware or software-based sources, including entropy sources, can be aggregated with or without caching and distributed over diverse channels and protocols. Number sequences can be combined with and/or transmitted together with information on the provenance and/or other details of the creation of each number sequence. This information can be used to verify the reliability of each number sequence and/or its associated source. A use indicator can also be combined and/or transmitted with a number sequence to avoid re-use of the number sequence.

An example method of distributing identifiable random number sequences can include one or more of the following steps presented in no particular order, and the method can include additional steps not included here. A computational system having one or more processors can be provided. The computational system can be in communication with two entropy sources and an external network. The computational system can receive electrical signals representing entropy measurements from each entropy source, generate random number sequences based on the electrical signals, generate identifiers each associated with a respective entropy source, assign each identifier to a random number sequence based on the entropy source from which the random number sequence originates, and/or distribute the random number sequences and identifiers to an external network.

The computational system can generate tags that each include one of the identifiers, generate tagged random number sequences that include a tag and the random number sequence associated with the identifier in the tag, and/or distribute the tagged random number sequences to the external network. Some or all of the random number sequences and identifiers originating from one entropy source can be aggregated into an aggregation pool and some or all of the random number sequences and identifiers originating from the other entropy source can be aggregated into a different aggregation pool. Aggregation headers and aggregation sequences can be generated and each aggregation sequence can include an aggregation header concatenated with tagged random number sequences. Each random number sequence can be transformed by encryption, encapsulation, and/or other means, resulting in transformed random number sequences. The transformed random number sequences can be distributed to the external network.

The computational system can receive a request from the external computing network for a random number sequence originating from one of the two entropy sources, and the computational system can provide to the external network a random number sequence associated with an identifier that is associated with the requested entropy source. The computational system can store its random number sequences and identifiers to memory, retrieve the requested random number sequence from the memory, and provide the requested random number sequence to the external network.

The computational system can store the identifiers to memory, and identifiers associated with each entropy source can be generated based on data in the memory. Each of the identifiers can be distinguishable from every other identifier such that each random number sequence is associated with a unique identifier.

The computational system can store random number sequences prior to distributing them to an external network and overwrite random number sequences after they have been distributed to the external network only once to facilitate single use distribution. Alternatively, stored random number sequences can be distributed multiple times to the external network. In addition to either alternative, or as another alternative, use indicators each associated with a random number sequence can be generated and distributed to the external network with the respective random number sequence to facilitate single use or multiple use of the random number sequences.

An example entropy delivery system can include two entropy appliances for generating random electrical signals and a computational system for processing the random electrical signals and distributing identified random number sequences based on the random electrical signals. Each entropy appliance can have its own entropy source and each can generate the respective random electrical signal based on a physical process of the respective entropy source. The computational system can have one or more inputs in communication with outputs from the entropy appliances, an output in communication with the external network, a processor, and memory with instructions that can be executed by the processor to execute steps including: generating identifiers each based on the electrical signal from each respective entropy source, generating random number sequences based on the electrical signal from each respective entropy source, and providing a communication signal representing the identifiers and random number sequences to the output in communication with the external network.

The memory can alternatively or additionally include instructions thereon that can be executed by the processor to perform one or more steps in the above example method.

The memory can include additional instructions that can be executed by the processor of the computational system to perform steps including: aggregating random number sequences and associated identifiers into separate aggregation pools based on entropy source data in each identifier, generating tags each including an identifier, concatenating each tag with a random number sequence to generate tagged random number sequences, generating aggregation headers, concatenating each aggregation header with tagged random number sequences to generate aggregated random number sequences, and/or transforming the random number sequences thereby generating transformed random number sequences. The communication signal provided by the processor can be further based on the tagged random number sequences, aggregated random number sequences, and/or transformed random number sequences.

The entropy delivery system can additionally include an identifier memory store in communication with the computational system. The memory with processor instructions can further include instructions that can be executed by the processor to generate the identifiers based on data in the identifier memory store.

The entropy delivery system can include a router and an out of band management system. The out of band management system can include one of the two entropy appliances in communication with the computational system, and the entropy appliance in the out of band management system can communicate with the computational system through the router.

An example distributed computing environment can include a random distribution service engine and a control system. The random distribution service engine can have an input for receiving electrical signals from entropy sources, a processor, and memory with instructions that can be executed by the processor to execute steps including: differentiating electrical signals as originating from different entropy sources and generating tagged random number sequences each derived from the electrical signals and each including a tag associated with an entropy source. The control system can connect with an external network and can include a processor and memory with instructions that can be executed by the processor to execute steps including: receiving a request from the external network for a random number sequence for a requested entropy source, transmitting instructions to the random distribution service that when executed by the processor of the random distribution service cause the random distribution service to provide a tagged random number sequence having a tag indicative of the requested entropy source, receiving the requested tagged random number sequence from the random distribution service, and transmitting the requested tagged random number sequence to the external network.

The memory of the random distribution service engine can have instructions that can be executed by the engine's processor to execute steps including: generating aggregation sequences each including a combination of tagged random number sequences and an aggregation header having data indicative of the combination of tagged random number sequences. The memory of the control system can have instructions that can be executed by the control system's processor to execute steps including: receiving a request for a specific combination of random number sequences from the external network, transmitting executable instructions to the random distribution service that can be executed by the service's processor to cause the random distribution service to provide an aggregation sequence representing the requested specific combination of random number sequences, receiving the requested aggregation sequence from the random distribution service, and transmitting the requested aggregated sequence to the external network.

The distributed computing environment can further include at least one of the quantum entropy sources providing an electrical signal to the random distribution service.

An example entropy system node can include an entropy source, an entropy interface, an identifier engine, and a distribution engine. The entropy source can provide an electrical signal representing a physical entropy process. The entropy interface can provide a random bit stream based on the electrical signal. The identifier engine can provide a tagged random number based on the random bit stream and including information indicative of the entropy source. The distribution engine can provide a verifiable random number sequence based on the tagged random number sequence to an external network. The entropy system node can be a portable electronic device such as a cellular telephone, tablet computer, laptop computer, and the like. The entropy system node can further include an aggregator engine that can provide an aggregated random number sequence including the tagged random number sequence and one or more additional random number sequences, and the verifiable random number sequence can be based on the aggregated random number sequence.

The entropy system node can be in communication through the external network with a second entropy system node having a second entropy source.

Another example entropy system node can include memory with a random data sequence stored thereon, an identifier engine, and a distribution engine. The identifier engine can provide a tagged random number sequence including a random number based on the random data sequence and a tag identifying the entropy system node. The distribution engine can provide a verifiable random number sequence to the external network based on the tagged random number sequence.

The entropy system node can further include a sensor providing sensor data and an encryption engine that can encrypt the sensor data and deliver the encrypted sensor data to the external network. The sensor data can be encrypted by the encryption engine based on the verifiable random number sequence such that the verifiable random number sequence is used in a step to decrypt and/or encrypt the sensor data.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

DETAILED DESCRIPTION

Figure 1:
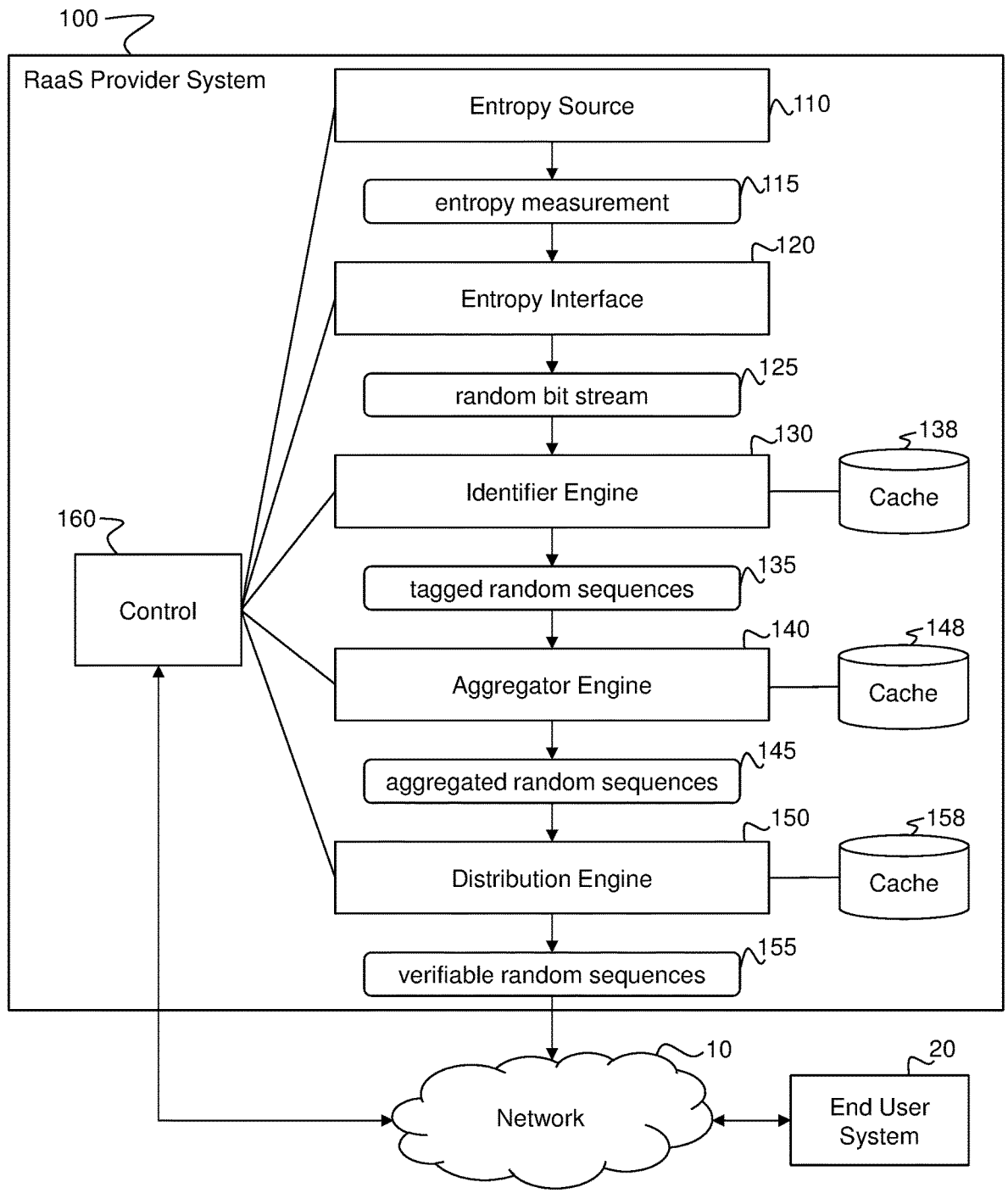
FIG. 1 is a flow diagram illustrating the generation and transmittal of verifiable random number sequences and example system components, functional blocks, and data structures for the same according to aspects of the present invention.

Heretofore the following acronyms will be used herein:
API Application Program Interface
CaaS Cryptography as a Service
PRNG Pseudo Random Number Generator
RaaS Randomness as a Service
REST Representational State Transfer Because advances in computers and mathematics are expected to make obsolete computer security systems that currently rely on pseudo random and random numbers generated by deterministic sources and/or low entropy sources, it is anticipated that manufacturers, software developers, and third-party telecommunications providers will be in search of relief from their reliance such sources for encryption. It is therefore an object of the present invention to provide access to high quality, verifiable random numbers from entropy sources including quantum entropy sources on-demand through application program interfaces (APIs) and other interfaces.

The concept of cloud computing and associated technologies like Infrastructure as a Service (IaaS), Software as a Service (SaaS) and others, can be extended to include Randomness as a Service (RaaS) and Cryptography as a Service (CaaS). The availability of RaaS from quantum sources and CaaS is expected to be uniquely important due to the advent of quantum computers which can in principle break many existing cryptosystems. Quantum entropy is a truly probabilistic process from which truly random numbers can verifiably be extracted and can accurately be described as Entropy as a Service (EaaS).

In some examples, a computer system can be provided that can include a processor and a memory that stores computer-executable instructions that when executed by the processor, the processor can perform various operations including manipulating, recording, expanding, and aggregating random numbers from entropy sources, assigning unique identifiers to such aggregate random numbers, storing the aggregate random numbers in memory, and distributing the aggregate random numbers in a single device (e.g. system on a chip in a mobile or field deployed device) or across a network. Several of such computer systems can be assembled in groups of systems creating a larger network structure of individual nodes that can be physical or virtualized. Currently, many mobile and field deployed devices have sufficient computing power to serve as a virtualized node, and it is expected as technology advances, it will become possible and cost effective to integrate physical entropy sources into a system on a chip or other small form factor circuitry so that mobile and field deployed devices can serve as a stand-alone RaaS or as nodes in a RaaS. The computer systems can facilitate the transmission of random number sequences over numerous network protocols and the access of the random number sequences by end users through APIs at fixed or mobile devices. In some examples, the random numbers can be consumed or stored securely within a device exclusively, preventing access of the random numbers to other devices or users.

In some examples, the computer system and/or larger network infrastructure can facilitate end-to-end tracking and verification of each specific entropy source and method of generating the entropy for sequences of random numbers.

Source identifiers can be assigned to each random sequence produced, thereby enabling process differentiation for their use in applications. In some examples physical hardware can be mixed and matched in a single node to produce additional variants of random sequence for customizable application requirements. For example, sequences with two or more sources can be interleaved with or without source identifiers.

In some examples, a centralized repository and distribution node can assign a large unique identifier to each random sequence. This centralization feature can ensure random numbers are delivered to a single storage location, address or user endpoint without replication elsewhere. While simultaneously servicing multiple endpoints, the centralized feature can reduce or eliminate the risk of exposing the same random sequence to more than one endpoint even when different network protocols are used to access the same cache or storage medium. Paired with an optional cache, service level can assure random sequence distribution and provisioning.

In some examples, because each random sequence can carry its own internal consistency check, identifying information, and/or source identifiers, extension to multi-node distribution (Horizontal Scaling) can be achieved simply by adding servers. This model can be extendable to scale tailored generated random number sequences to meet a variety of demands by adding additional system nodes without conflict among nodes.

In some examples, a method performed by the computer can also include directly accessing a unique entropy source and extracting a specific random stream or block. The specific random stream or block can be intermittently stored or cached prior to distribution to the ultimate user. Random streams or block can be generated from combinations of external sources from sister nodes and networks prior to caching. Processes for combining and/or caching random streams or blocks can be extensible to a virtualized environment or network and can be deployed in a cloud network.

FIG. 1 is a flow diagram illustrating example system components, functional blocks, and data structures for generating and transmitting a verifiable random number sequence to an end user. At a high level, example systems herein include a Randomness as a Service (RaaS) provider system 100 that can deliver verifiable random number sequences 155 over a network 10 to an end user 20. The RaaS 100 can include an entropy source functional block 110 for generating an entropy measurement 115, an entropy interface functional block 120 for converting the entropy measurement 115 into a random bit stream 125, an identifier engine functional block 130 for converting the random bit stream 125 into a tagged random sequence 135, an aggregator engine functional block 140 for combining tagged random sequences 135 into an aggregated random sequence 145, a distribution engine functional block 150 for transforming the aggregated random sequence to generate a transformed random sequence 155 that can be securely transmitted over the network 10 to an end user 20, and a controller functional block 160 that can provide commands to some or all of the functional blocks. Each of these will be discussed in more detail below.

The RaaS provider system 100, network 10, and end user system 20 can be confined within a singular computational device or appliance (e.g. between nodes of a super computer, within a mobile personal electronic device, or within a transmitting sensor) geographically located at a singular site, or the RaaS provider system 100 can include multiple computational devices or appliances located at multiple, disparate geographical locations in communication over the Internet or other such network. As will be appreciated and understood by a person of ordinary skill in the art, other example RaaS systems, functional blocks, and system nodes presented herein can be similarly confined or distributed. Each functional block illustrated in FIG. 1 can represent a singular hardware component or software module or plurality of hardware components and/or software modules having similar, identical, and/or coordinated functionality. The network 10 can be an external network such as the internet, a network internal to an organization, connections within a single device, etc. The network can be secured or unsecured. The end user system 20 can be a system capable of receiving random number sequences and providing the random number sequences to an end user.

The entropy source functional block 110 can include a singular entropy source or a combination of one or more entropy sources. The entropy source functional block 110 can also include one or more non-entropy sources. The entropy source functional block 110 can include one or more quantum entropy sources and/or one or more non-quantum entropy sources. The entropy source functional block 110 can produce an entropy measurement 115 as an output. The entropy measurement 115 can be one or more electrical signals, and each of the electrical signals can be representative of, or at least based in part on, a probabilistic physical phenomenon occurring because of entropy in an entropy source in the entropy source functional block 110. Examples of a quantum entropy source include but are not limited to: a decaying radioactive substrate, phased fusion, heterodyne and homodyne detection, photon bunching, and device independence. Examples of a non-quantum entropy source include but are not limited to: thermal noise from a resistor or semiconductor diode, and frequency instability of a free running oscillator.

The entropy interface functional block 120 can include one or more hardware components, each having an input for receiving one or more electrical signals from the entropy measurement 115, an electrical circuit for sampling and digitizing each electrical signal, and an output for providing one or more random bit streams 125, each representative of, or at least based in part on, the entropy measurement 115. Each hardware component can be associated with one or more entropy sources; hence, if the entropy source functional block 110 includes multiple entropy sources, the entropy interface functional block 120 can include multiple hardware components.

The entropy source functional block 110 and the entropy interface functional block 120 can collectively be realized by one or more entropy appliances.

The random bit stream or streams 125 output from the entropy interface functional block 120 can be provided as an input to an identifier engine functional block 130. The identifier engine functional block 130 can include one or more computational devices that can, upon receiving the random bit stream or streams 125 from one or more hardware components of the interface functional block 120, associate a random bit stream with a source from the entropy source functional block 110 and generate tagged random sequences 135 based on the raw random bit stream 125 and include data related to the associated source. Examples of computational devices of the identifier engine functional block 120 can include but are not limited to: general purpose computers, servers, field programmable gate arrays (FPGAs), processor arrays, network arrays, dedicated applications specific integrated circuits (ASIC), virtual machines, etc.

In some examples, to support variance in computing environments and trust, the amount of tagging and parameters used for each random number stream can be adjusted or appended at various points throughout the distribution process. In an example implementation, a random number sequence including headers and/or other identifiers can be transmitted to users within a group, each user having different levels of security access. A user having a lower level of access can have access to only a fraction of the digits in the random number and a super user can have access to the entire random number. The headers and/or other identifiers in the random number sequence can be used to determine the clearance level of the user.

Computational devices of the identifier engine functional block 130 can be in communication with cache storage 138. The cache storage 138 can serve as a repository of identifiers. In some examples, the cache storage 138 can include a global directory of identifiers to be used by computational devices in the identifier engine functional block 130. Some or all of the computational devices within the identifier engine functional block 130 can be in communication with each other over a coordination channel to maintain the global directory. The global directory can serve as a point of deconfliction and centralized cataloging of blocks or streams of random numbers.

Tagged random sequences 135 output from the identifier engine functional block 130 can be provided as an input to an aggregator engine functional block 140. The aggregator engine functional block 140 can include one or more computational devices that can, upon receiving the tagged random bit streams 135, sort the tagged random sequences 135 into aggregation pools in preparation for distribution. Aggregation pools can be divided in physical or virtual memory storage such as a cache 148 into discrete categories. Examples of aggregation categories include but are not limited to: undifferentiated non-quantum uniquely tagged random numbers, undifferentiated quantum uniquely tagged random numbers, differentiated quantum uniquely tagged random numbers with identical tags from a single source, differentiated quantum uniquely tagged random numbers with identical tags from multiple sources, differentiated quantum and non-quantum uniquely tagged random numbers with identical tags from a single source, undifferentiated and interleaved quantum and non-quantum tagged random numbers with identical tags from a single source, and other permutations thereof.

Aggregated random sequences 145 can be collected by the distribution engine functional block 150. The distribution engine functional block 150 can include one or more network provisioning systems, each including network provisioning hardware such as network servers, data storage, internet access devices and equipment, etc. The distribution engine functional block 150 can serve as a randomness service provisioning layer that can transform and distribute tagged random sequences 135 and/or aggregated random sequences 145 into verifiable random sequences 155 for transmission over the network 10 to the end user system 20. The distribution engine functional block 150 can transform the random number sequences to be compatible with RESTful architecture, stated services, streaming services, etc. to meet the network requirements and end user demands.

The control functional block 160 can include one or more controllers, each controller having one or more processors. In some examples, the control functional block 160 can include a singular control unit, the singular control unit can provide commands to coordinate random number generation, tagging, aggregation, and distribution activities of the RaaS provider system 100, even if the entropy source functional block 110 has multiple entropy sources, the entropy interface functional block 120 has multiple hardware components, the identifier engine functional block 130 has multiple computing devices, the aggregator engine 140 has multiple computing devices, and/or the distribution engine 150 has multiple network provisioning devices. Alternatively, the RaaS provider system 100 can include multiple nodes, each node having one or more controllers, and each node having hardware and/or software to perform the functions of some or all of the functional blocks 110, 120, 130, 140, 150, 160. The control functional block 160 can also include control layers such that a master controller can be in communication with controllers of individual nodes and can serve to coordinate activities of each node.

Some or all of the controllers in the control functional block 160 can be in communication with the end user system 20 via the network 10. The end user system 20 can provide information and/or a request to the control functional block 160, and the control functional block 160 can coordinate activities of some or all of the other functional blocks 110, 120, 130, 140, 150 of the RaaS provider system 100 so that the end user system 20 is provided verifiable random number sequences 155 that meet the needs and/or requests of an end user and the end user system 20.

The network 10 can include one or more of a multitude of transmission means including radio transmission, free space optical transmission, acoustic transmission, fiber optic transmission, wired network transmission, etc. The network 10 can also include computer readable storage media. The network 10 can direct data traffic based on a network protocol or communication standard such as internet protocols, wireless network protocols, network routing protocols, etc.

The end user system 20 can include computational devices and/or systems to receive the verifiable random sequences 155, decrypt, decapsulate, or otherwise transform the verifiable random sequences 155, verify the random sequence based on tags and/or headers appended to, or otherwise associated with, the random sequence, and utilize the random sequence for an end use application.

In some examples, each functional block 110, 120, 130, 140, 150, 160 of the RaaS system 100 can be executed on a different device, at a different location, and/or by a different owner. Additional network distribution layers can be added to the RaaS system 100 to facilitate transmission of entropy measurements 115, random bit streams 125, tagged random number sequences 135, aggregated random sequences 145 between separate devices over various network connections.

In some examples, it can be advantageous for aggregation to occur at the end user system 20 such that the RaaS system 100 has no visibility to the end user system's aggregation scheme, thereby increasing secrecy at the end user system 20. In such an example, the RaaS system 100 need not have the aggregation engine functional block 140.

In some examples, each functional block 110, 120, 130, 140, 150, 160 of the RaaS system can be incorporated into a mobile device. Currently, most mobile personal electronic devices such as cell phones, tables, laptops, etc. have sufficient network connectivity and computing power to serve as virtual entropy sources—receiving random numbers from hardware entropy sources and recombining the received random numbers to generate new random number sequences. As hardware quantum entropy sources become easier to integrate on an integrated circuit, it is contemplated that the functional blocks 110, 120, 130, 150, 160 including quantum entropy hardware can be integrated as a system on a chip, or other small form factor circuit capable of being integrated into the portable size of a mobile personal electronic device. A mobile device having a hardware entropy source 110 and integrated RaaS system 100 can serve as its own end user 20, and/or can serve as a node within the RaaS system 100.

In some examples, a computing system having a memory store isolated from a network (e.g. a transmitting sensor with an isolated internal hard drive or flash memory) can serve as a RaaS provider system with functionality similar to as illustrated in FIG. 1. The memory store can be preloaded with one or more large random bit streams generated by an external entropy appliance. Once pre-loaded, the computer system can be deployed in the field to gather data and use the preloaded random bit stream to establish cryptographic key agreement for secure data transmission. Compared to the RaaS system 100 illustrated in FIG. 1, the isolated preloaded memory of the deployed computing system can be used in place of the entropy source 110 and the entropy interface 120 illustrated in FIG. 1, and the deployed computing system can otherwise have functionality as described in relation to FIG. 1.

The computing system can include an identifier engine and a distribution engine such as described in relation to the identifier engine functional block 130 and the distribution engine functional block 150 illustrated in FIG. 1. The computing system can access random bit streams from memory, generate a tagged random number sequence with the identifier engine, transform the random number sequence for distribution, and transmit the transformed random number to a home network. The tag can include information so that the home network can identify the computing system. In some examples, the computing system can also include an aggregator engine and associated cache with functionality similar to as described in relation to the aggregator engine functional block 140 and the cache 148 illustrated in FIG. 1 and other example RaaS systems presented herein.

Figure 2:
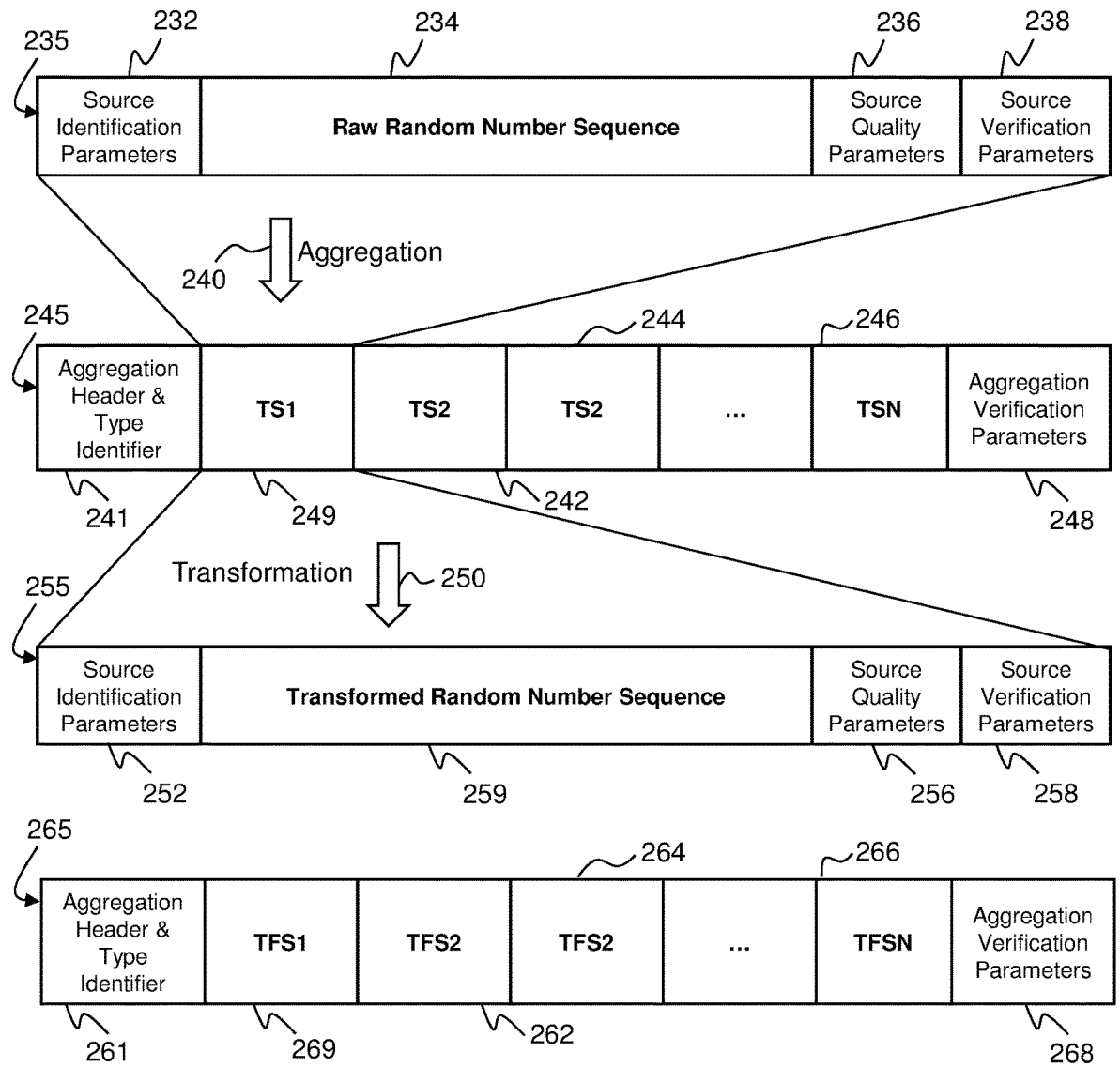
FIG. 2 is a block diagram illustrating example data structures for tracking and delivering a random number sequence to an end user according to aspects of the present invention.

FIG. 2 is a block diagram illustrating example data structures for tracking and delivering a random number sequence to an end user system. A tagged random number sequence 235 can include a raw random number sequence 234, and one or more tags including source identification parameters 232, source quality parameters 236, source verification parameters 238, and/or other tags and metrics. The tagged random number sequence 235 can be generated as the output 135 of the identifier engine functional block 130 illustrated in FIG. 1 or as an output of a computational device and/or identifier engine as described in other examples presented herein.

The source identification parameters 232 can be generated by an identifier engine and/or received from an entropy interface and can be indicative of a specific entropy source or group of random or pseudo-random number sources, such as sources in the entropy source functional block 110 illustrated in FIG. 1 and also as described in other examples presented herein.

The raw random number sequence 234 can include a binary, symbolic, or other computer readable representation of a random bit stream derived from the entropy source or sources to which the identification parameters 232 are associated. The raw random number sequence 234 can be a representation of the random bit stream 125 illustrated in FIG. 1 and also as described in other examples presented herein.

The source quality parameters 236 can include data indicative of the randomness of the source data, i.e. health checks on entropy sources. Random sequences and packets can include integrity and randomness checks for internal consistency at the physical hardware level at the point of generation. This can include tools from the National Institute of Standards and Technology's statistical test suite and other statistical analysis. In some examples, the source quality parameters 236 can indicate an expected error rate due to noise on the transmission channel over which the random number sequence is transmitted.

The source verification parameters 238 can include data that can be cross-compared within the tagged random number sequence 235 as a check that an end user can use to detect tampering and/or degradation of a received verifiable random sequence that includes the tagged random number sequence 235 or a transformation or a modification thereof. At each protocol level from randomness origin to receipt by an end user, some examples presented herein can facilitate verification against internal consistency numbers. These extra controls and analysis can prevent the distribution of any non-randomizing behaviors and bias on a computer network, accidental corruption of the random numbers in transit or at rest, and/or compromise of the random numbers by a nefarious actor.

The tagged random number sequence 235 can be aggregated with one or more other tagged random number sequences in an aggregation step 240 to form an aggregated random sequence 245. The aggregated sequence 245 can include an aggregation header and type identifier 241, a representation 249 the aforementioned tagged random number sequence 235 concatenated with other concatenated tagged random number sequences 242, 244, 246, and aggregation verification parameters 248.

The aggregation step 240 can be performed by an aggregator engine including a computational device of the aggregator engine functional block 140 illustrated in FIG. 1 and also as described in other examples presented herein. The aggregation sequence 245 can be an output 145 of the aggregator engine functional block 140 illustrated in FIG. 1 or otherwise output from an aggregator as described in other examples presented herein.

The aggregation header and type identifier 241 can include unique information associated with the aggregated sequence 245 such as information on the provenance of the aggregation or other information that can be useful for the purposes of traceability and/or quality check.

The tagged random number sequence 249 in the aggregated sequence 245 can be unmodified, and simply concatenated when aggregated into the aggregated sequence 245, or the tagged random number sequence 249 can be transformed or otherwise modified from the tagged random number sequence 235 on which it is based. Similarly, concatenated tagged random number sequences 242, 244, 246 of the aggregated sequence 245 can be unmodified or can be modified during the aggregation step 240.

The aggregation verification parameters 248 can include data that can be cross-compared within the aggregation sequence 245 as a check that an end user to use to detect tampering and/or degradation of a received verifiable random sequence including the aggregation sequence 245 or modification or transformation thereof.

The aggregation sequence 245 and/or individual tagged random number sequences 242, 244, 246, 249 can be transformed for delivery over a network in a transformation step 250. A transformed tagged random number sequence 255 can include source identification parameters 252, a transformed random number sequence 259, source quality parameters 256, source verification parameters 258, and other tags and data. In some examples, an individual tagged random number sequence 242, 244, 246, 249 can be extracted from the aggregated sequence 245, transformed, and delivered over a network as a verifiable random sequence such as the verifiable random number sequence 155 illustrated in FIG. 1 and other examples presented herein.

Additionally, or alternatively, in some examples, individual tagged random number sequences 242, 244, 246, 249 can be transformed into transformed tagged random number sequences 262, 264, 266, 269 without being extracted from the aggregated sequence 245, resulting in a transformed aggregated sequence 265, and the transformed aggregated sequence 265 can be transmitted over a network as a verifiable random sequence such as the verifiable random number sequence 155 illustrated in FIG. 1 and other examples presented herein.

Regardless of whether the verifiable random number is the transformed tagged random number 255, the transformed aggregated sequence 265, or simply the tagged random number sequence 235, the verifiable random number sequence 255, 265 can be an output 155 of the distribution engine functional block 150 as illustrated in FIG. 1 or otherwise output from a network provisioning device and/or distribution engine as described in other examples presented herein.

Referring to transformed tagged random number sequence 255, the source identification parameters 252 can be identical to, or be at least based in part on, the source identification parameters 232 of the non-transformed tagged random number sequence 235 on which the transformed random number sequence 255 is based. In some examples, source identification parameters 252 can be modified during the aggregation step 240 to include additional tag data or otherwise modified. In some examples, source identification parameters of the individual tagged random number sequence 249 in the aggregated sequence 245 can be modified during the transformation step to be encrypted, encapsulated, or otherwise transformed and/or modified. Similarly, for the source quality parameters 256, source verification parameters 258, and other tags, said parameters 256, 258 and tags can be modified during the aggregations step 240 and/or during the transformation step 250, or said parameters 256, 258 and tags can be identical to the parameters 236, 238 and tags of the tagged random number sequence 235 on which the transformed random number sequence 255 is based.

The transformed random number sequence 259 can be a transformation (e.g. XOR operations, interleaving, encryption, checksum extraction, code generation, cryptographic hashing, encapsulation, other transformation, or combination of transformations) of the raw random number sequence 234 of the tagged random number sequence 235 on which the transformed tagged random number sequence 255 is based.

Referring to the transformed aggregated sequence 265, the aggregation header & type identifier 261 can be identical to, or be at least based in part on, the aggregation header & type identifier 241 of the non-transformed aggregated sequence 245 on which the transformed aggregated sequence 265 is based. In some examples, the transformation step 250 can include modifying the aggregation header & type identifier 241 by adding additional data, encapsulating, encrypting, and/or other modification. Similarly, the aggregation verification parameters 268 and other tags of the transformed aggregated sequence 265 can be identical to, or modified based on, aggregation verification parameters 248 and tags of the non-transformed aggregated sequence 245 on which the transformed aggregated sequence 265 is based.

Each transformed tagged random number sequence 262, 264, 266, 269 of the transformed aggregated sequence 265 can be structured like the illustrated transformed tagged random number sequence 255. Alternatively, raw random number sequences 234 of the aggregated tagged random number sequences 249, 242, 244, 246 can be combined and transformed within an alternative transformed aggregated sequence. In the alternative example, source identification parameters 232, source quality parameters 236, source verification parameters 238, and/or other parameters or tags of the individual random number sequences 249, 242, 244, 246 can be preserved or discarded.

If preserved, some or all of the parameters and tags can be written into a new or existing header, parameter, and/or tag of the alternative transformed aggregated sequence, some or all of the parameters and tags can be transformed together with the raw random number sequences, and/or some or all of the parameters and tags can otherwise be preserved in the alternative transformed aggregated sequence.

Figure 3:
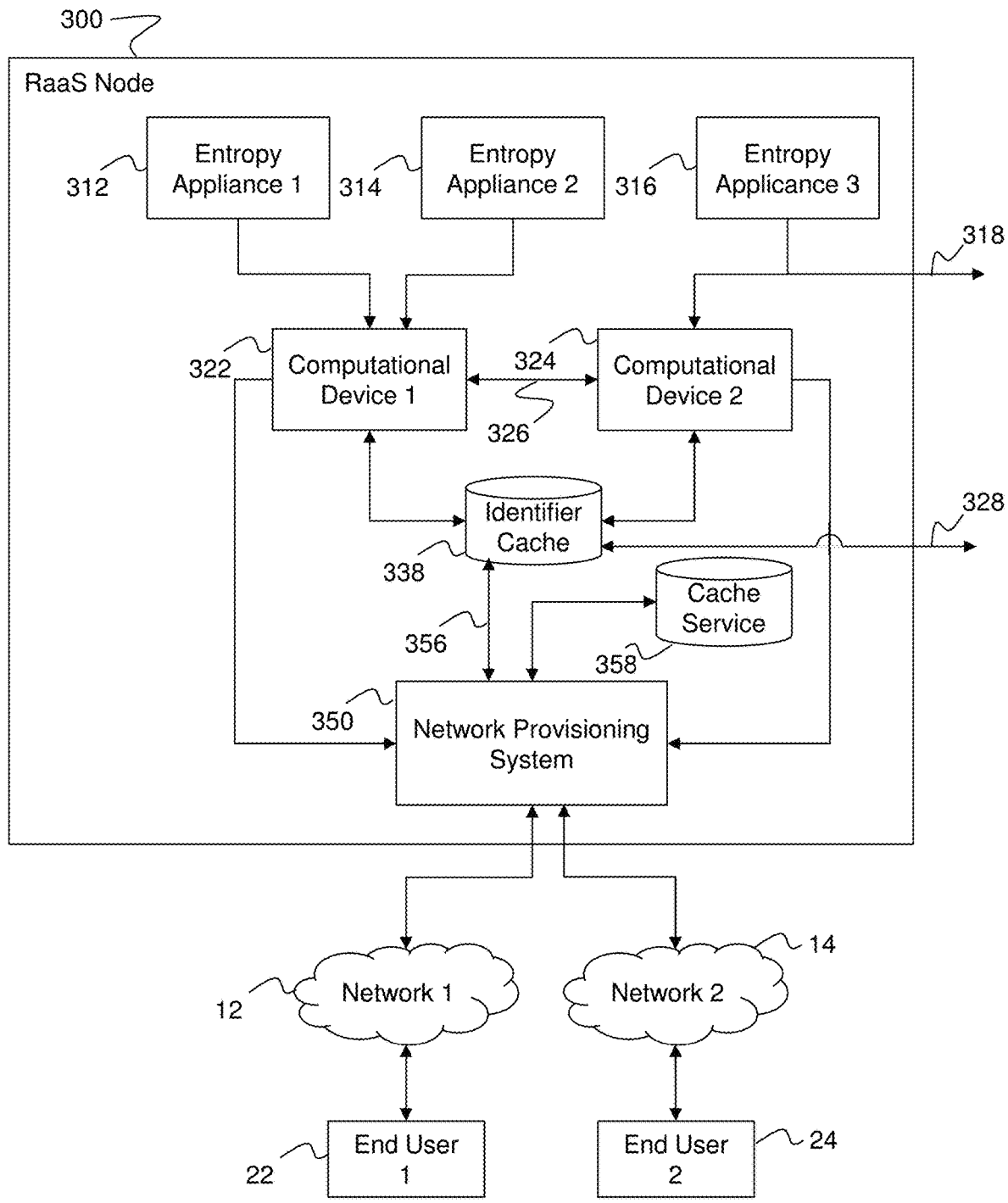
FIG. 3 is a block diagram illustrating example system components and functional blocks of a system node for generating and transmitting a verifiable random number sequence to an end user according to aspects of the present invention.

FIG. 3 is a block diagram illustration of system components within an example RaaS node 300 configured to deliver verifiable random number sequences to end users. The node 300 can include entropy appliances 312, 314, 316 for generating electrical signals representative of a physical process, computational devices 322, 324 for generating tagged and/or aggregated random number sequences based on the electrical signals, an identifier cache 338 serving as a repository for coordinated identifiers, a network provisioning system 350 for providing verifiable random number sequences to end users 22, 24 through networks 12, 14, and a cache service 358 serving as a repository for tagged and aggregated random number sequences. The node 300 can also be linked to one or more sister nodes to form a larger RaaS system through links 318 providing raw random electrical signals 318 and/or links 328 to the identifier cache 338.

The entropy appliances 312, 314, 316 can each include an entropy source that is quantum or non-quantum. The node 300 can include a combination of both quantum and non-quantum entropy appliances 312, 314, 316. Each entropy appliance 312, 314, 316 can individually sense, sample, measure and digitize physical processes to generate a computer readable signal. Individual appliances 312 can provide its entropy based random electrical signal to one or more computational devices 322, 324. As illustrated in FIG. 3, a first entropy appliance 312 and a second entropy appliance 314 can provide their respective electrical signals as an input to a first computational device 322, and a third entropy device 316 can provide its electrical signal to a second computational device 324 and additional computational devices through connection 318, which can be a connection to a sister node.

Computational devices 322, 324 can process the electrical signals from the entropy appliances 312, 314, 316 to generate computer readable random number sequences and provide the random number sequences to the network provisioning system 350. The generated random number sequences can be raw, tagged, aggregated, and/or tagged and aggregated. The computational devices 322, 324 can generate the random number sequences according to examples presented herein and as would be appreciated and understood by one of ordinary skill in the art.

Computational devices 322, 324 can include one or more of a variety of means to convert the plurality of entropy sources into a digitized stream or block of random numbers readable by a computing device including, but is not limited to, general purpose computers and servers, field programmable gate arrays (FPGA), processor arrays and networks, dedicated application specific integrated circuits (ASIC) and virtual machines (VM).

Computational devices 322, 324 within a node 300 can be in communication with each other through a coordination channel 326. The coordination channel 326 can facilitate coordinated tagging and aggregation of random number sequences.

Additionally, or alternatively, computational devices 322, 324 can be in communication with an identifier cache 338. The identifier cache 338 can include a global directory of unique identifiers and can serve as a point of deconfliction and centralized cataloging of blocks or streams of random number sequences. In some examples, the identifier cache of the node 300 can be in communication with an identifier cache in a sister node via a communication link 328. Communication between the identifier cache 300 and the sister node identifier cache can facilitate coordinated identification and/or aggregation of random number sequences between the node 300 and its sister node.

The network provisioning system 350 can receive random number sequences (raw, tagged, aggregated, and/or tagged and aggregated) from the computational devices 322, 324. The network provisioning system can include hardware and software modules for transforming the random number sequences for distribution over external networks 12, 14 and for distributing the transformed random number sequences over the networks 12, 14. The random number sequences can be cached by cache service 358 prior to distribution so that end users 22, 24 can request previously generated random number sequences. In some examples, transformed random number sequences can include time stamps and the end users 22, 24 can request a random number sequence having a particular time stamp.

End users 22, 24 can access the RaaS node 300 through a single or multiple path included in the respective networks 12, 14. End users 22, 24 can directly request and receive random numbers from a specific appliance 312, 314, 316 with the appropriate tagging tracing the type from the specific appliance. Once received by the end user 22, 24, the random number sequences can be used at end applications that consume random number sequences, which may include computer programs, research data sets for single or multiple applications, encryption services for a plurality of media sources, simulations and data science processes, cryptographic and other network services.

Relating the system illustrated in FIGS. 1 and 3, the entropy appliances 312, 314, 316, illustrated in FIG. 3 can be part of the entropy source and entropy interface functional blocks 110, 120 illustrated in FIG. 1, the computational devices 322, 324 illustrated in FIG. 3 can be part of the identifier engine 130 and aggregator engine 140 functional blocks illustrated in FIG. 1, the identifier cache 338 illustrated in FIG. 3 can be part of the cache 138 in communication with the identifier engine 130 illustrated in FIG. 1, the network provisioning system 350 illustrated in FIG. 3 can be part of the distribution engine functional block 150 illustrated in FIG. 1, and the cache service 358 illustrated in FIG. 3 can be part of the cache 158 in communication with the distribution engine functional block 150 illustrated in FIG. 1. The RaaS system 100 illustrated in FIG. 1 can include multiple RaaS nodes such as the RaaS node 300 illustrated in FIG. 3 and variations thereof.

As an illustration of a specific implementation of the example system depicted in FIG. 3, the node 300 can include a first non-quantum entropy appliance 312, a second non-quantum entropy appliance 314, and a quantum entropy appliance 316. The first and second non-quantum entropy appliances can feed the first computational device 322 which can be a general purpose computer and which can generate uniquely tagged non-quantum random number sequences and aggregate the collection of the tagged sequences in an aggregated pool designated as an undifferentiated non-quantum uniquely tagged random numbers. The aggregated pool can be transmitted to the networking provisioning system 350, and the network provisioning system 350 can store the aggregated pool in the cache service 358 for later distribution to end users 22, 24. Concurrently, the second computational device 324, which can be an FPGA, can generate uniquely tagged quantum random number sequences and aggregate the tagged random number sequences into an aggregation pool separate from the aforementioned aggregation pool, the separate aggregation pool designated as an undifferentiated quantum uniquely tagged random numbers. The separate aggregation pool can be transmitted to the network provisioning system 350 which can immediately distribute a portion of the random number sequences in the pool to a first end user 22 over a fiber optic network 12 and store the remainder in the cache service 358. A second end user 24 can request random number sequences from either the pool of non-quantum number sequences or the pool of quantum number sequences, or both. The second end user 24 can request random number sequences originating from an entropy appliance at a particular date and time, and the network provisioning system 350 can provide random number sequences to meet the request of the second end user 24 based on date and time parameters in tags of the provided random number sequences.

As an illustration of another specific implementation of the example system depicted in FIG. 3, the node 300 can include a first quantum appliance 312, a non-quantum appliance 314, and a first computational device 322 integrated in a single hardware package (e.g. contained within a single housing, contained on a single printed circuit board, mounted together on a single rack, bundled together as a system package, etc.), and the first computational device 322 can include a dedicated processor for performing random number sequence generation. The node 300 can also include a second quantum entropy appliance 316 feeding a processor array 324. The hardware package including the first computational device 322 can uniquely tagged non-quantum random number sequences and identically tagged quantum random number sequences. The hardware package can aggregate the tagged sequences into two pools, the first pool designated as differentiated quantum and non-quantum tagged random numbers with identical tags for quantum source numbers, and the second pool designated as undifferentiated and interleaved quantum and non-quantum tagged random numbers with identical tags for quantum source numbers. Concurrently, the second computational device 324 can generate identically tagged quantum numbers and generate an aggregation pool designated differentiated quantum uniquely tagged random numbers. The first computational device 322 and the second computational device 324 can be in communication with each other via the coordination channel 326 such that tags assigned by the devices 322, 324 can be coordinated between each other (e.g. quantum number tags associated with the first quantum source 312 are able to be differentiated from quantum number tags associated with the second quantum source 316). The network provisioning system 350 can receive requests from each end user 22, 24 via the networks 12, 14 for random number sequences in a specific pool or combination of pools, and the network provisioning system 350 can stream verifiable random number sequences to each end user 22, 24 without caching.

Figure 4:
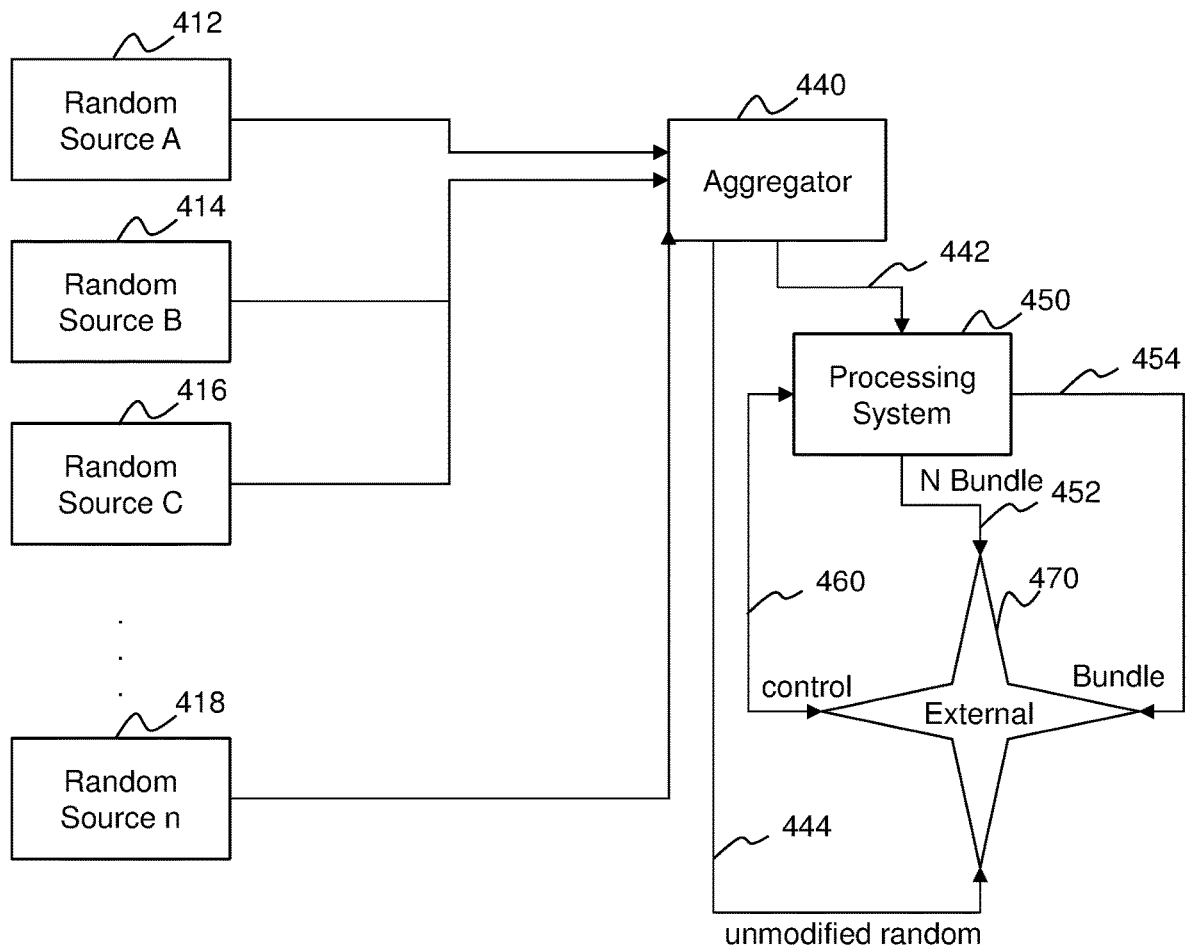
FIG. 4 is a block diagram illustrating example system components and functional blocks of a system or system node for controlling the aggregation, processing, and distribution of random number sequences according to aspects of the present invention.

FIG. 4 is a schematic of a plurality of entropy sources 412, 414, 416, 418, both quantum and non-quantum, coupled to an aggregator 440 illustrating the types of communications and random number sequences that can be communicated between a processing system 450 within a RaaS system and an external network 470. The lines from the entropy sources 412, 414, 416, 418 represent different paths of output from individual sources 412, 414, 416, 418 to the aggregator 440. Random number sequences can be generated and/or tagged at each source 412, 414, 416, 418 or at some point in the path from the source 412, 414, 416, 418 to the aggregator 440, or the aggregator 440 can receive raw, unmodified random sequences. In some examples, outputs from one or more sources 414, 416 can combine en route to the aggregator 440. The output of the aggregator 440 can supply a processing system 450 through a first path 442 or bypass the processor as unmodified random through a second path 444. The processing system 450 can output specific bundled random 452 from an individual source 418, combine multiple sources, or can bundle packetized random 454 for delivery to an external entity 470. The processing system 450 can receive command and control signals through a link 460 to the external entity 470 and respond to the external commands and controls by modifying its output or by directing operations of the aggregator 440 including the bundling of random and/or selection of sources.

Figure 5:
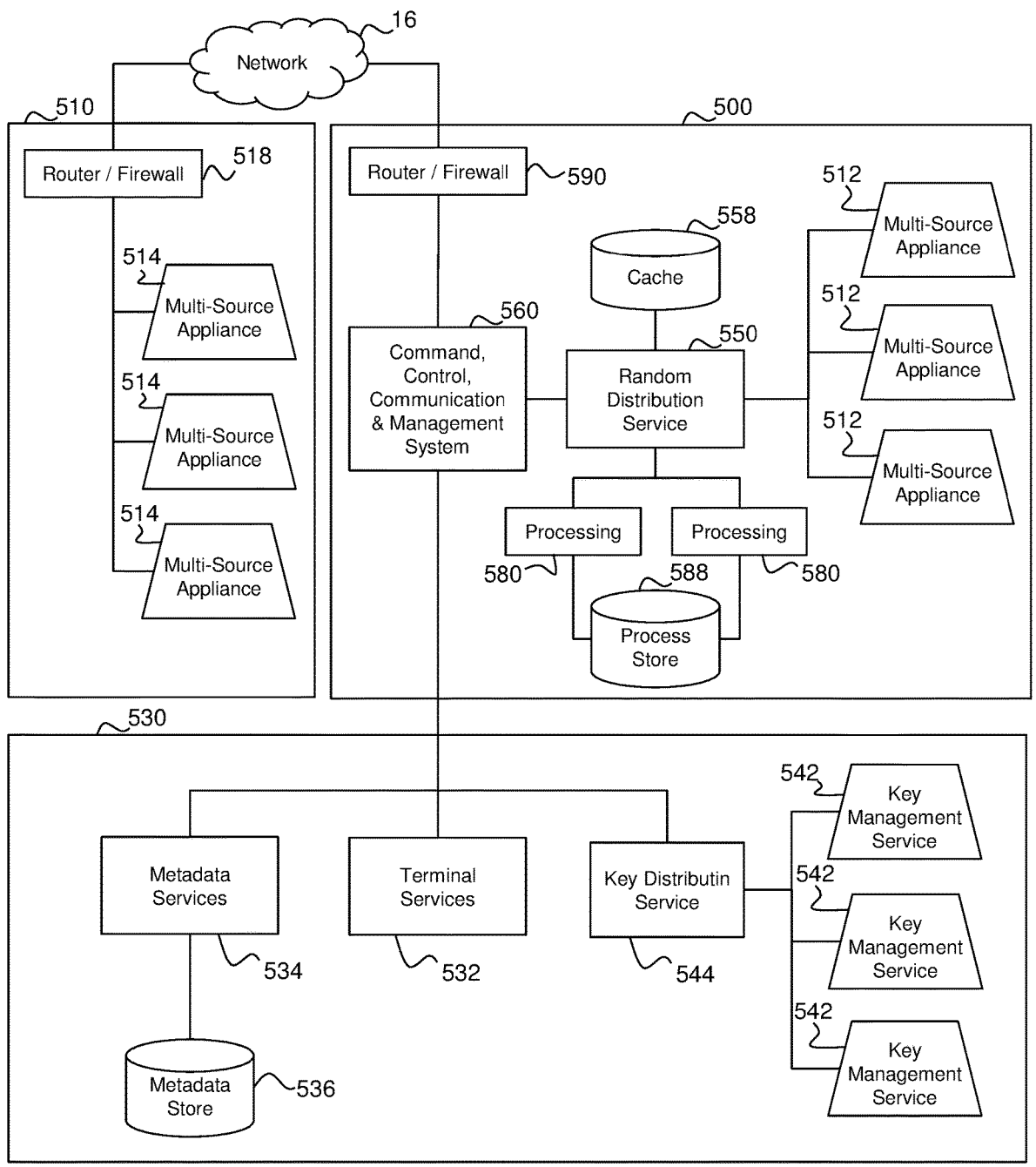
FIG. 5 is a block diagram illustrating example system components and functional blocks of a system including a random distribution service in communication with off site entropy sources and generating and providing random number sequences to terminal services as requested by the terminal services according to aspects of the present invention.

FIG. 5 is a block diagram illustrating an example service platform including a multi-source random provisioning and management node 500 supplied by an out of band management system of random sources 510 and providing verifiable random sequences to consumer service systems 530. The example management node 500 can include a random distribution service 550 connected to a cache 558. The management node 500 can include additional processing 580 and a randomness key store 588 attached for cryptographic applications, including key generation, key splitting, key management, and storage. The random distribution service 550 can operate autonomously or be controlled by a command, control and communication management system 560. The command, control and communication management system 560 can be connected by a firewall 590 to the internet or other type of computer network 16. The random distribution service 550 can be supplied with random numbers from multiple random data appliances 512, 514, which can also be connected to the internet, intranet or other type of computer network 16 with an out of band management system 510, to include a stand-alone external source 514. The out of band management system can also include a router and/or firewall 518. A router and/or firewall 590 can be added to the management node 500 or it can be directly accessible at the appliance level 512. Multi-source appliances 514 in the out of band management system 510 can supply random number streams to the random distribution service 550, and random source provisioning node 500 need not have its' own random sources 512.

The random distribution service 550 can export random number sequences directly or via a command, control, communication and management system 560, to one or more services 530. Services 530 can include terminal services 532, metadata services 534 with an attached metadata store 536, and/or a key distribution service 544. An example of a key distribution service 544 can be supplying cryptographic keys to clients, and the key distribution service 544 can be in communication with multiple key management services 542 for different groups or tiers of service.

Figure 6:
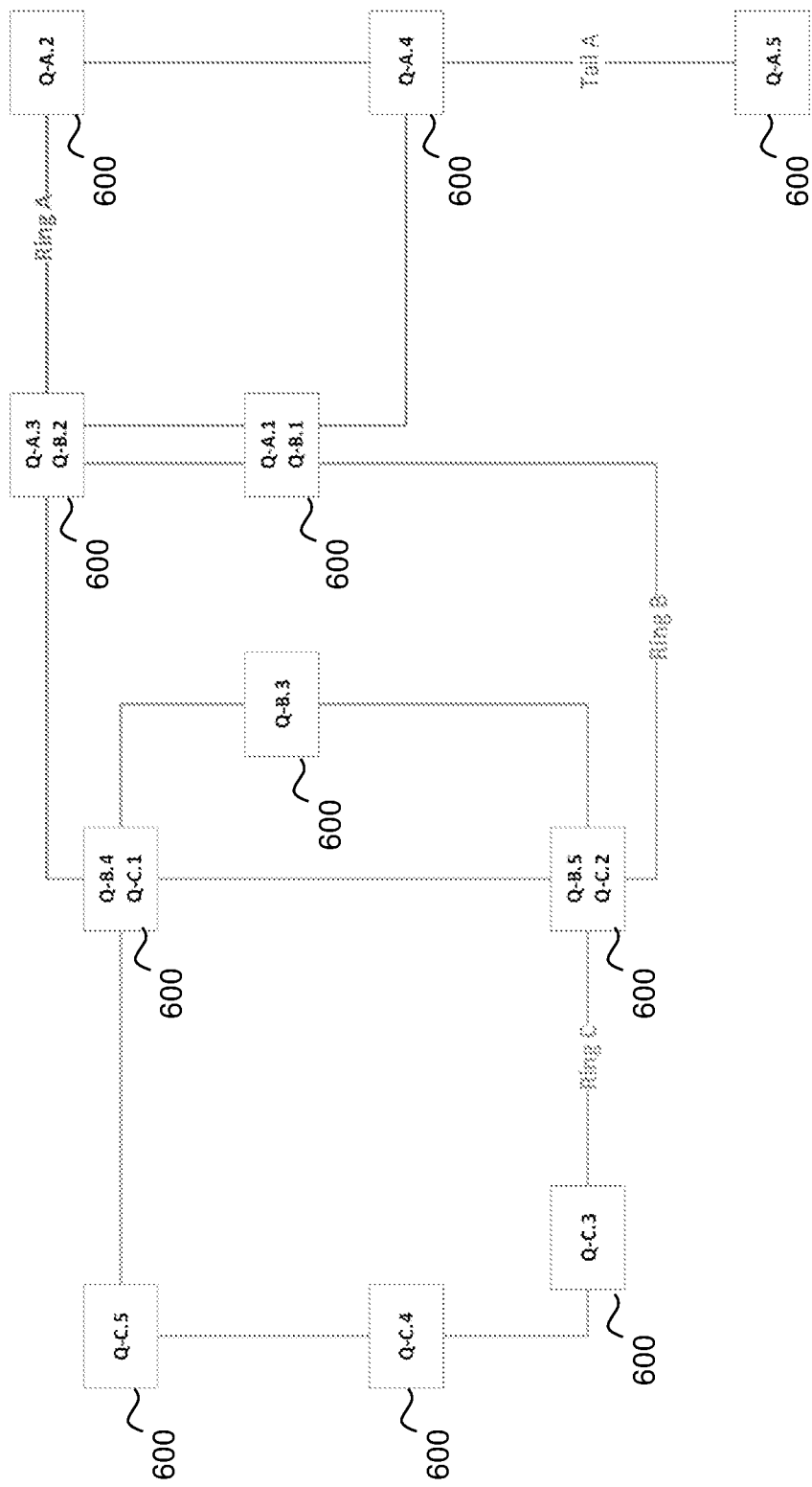
FIG. 6 is a block diagram illustrating an example system including multiple random service distribution nodes according to aspects of the present invention.

FIG. 6 is a block diagram illustrating an example RaaS system including multiple RaaS nodes 600 having similar, identical, or otherwise compatible architectures operating together or independently. In some examples, the RaaS system 100 architecture illustrated in FIG. 1, the RaaS node 300 illustrated in FIG. 3, the aggregator 440 and processing system 450 illustrated in FIG. 4, the RaaS node 500 and external source management system 510 illustrated in FIG. 5, and variations and combinations thereof can be replicated in various configurations, including cooperative nodes, public and private networks, isolated nodes which can be geographically dispersed or logically separated inside an enterprise. The nodes 600 can exist as virtual instances in a cloud architecture and are not limited to physical deployments. FIG. 6 examples show a plurality of ring, spoke and other serial and parallel configurations using the same—or compatible—architecture at each node 600.

Figure 7:
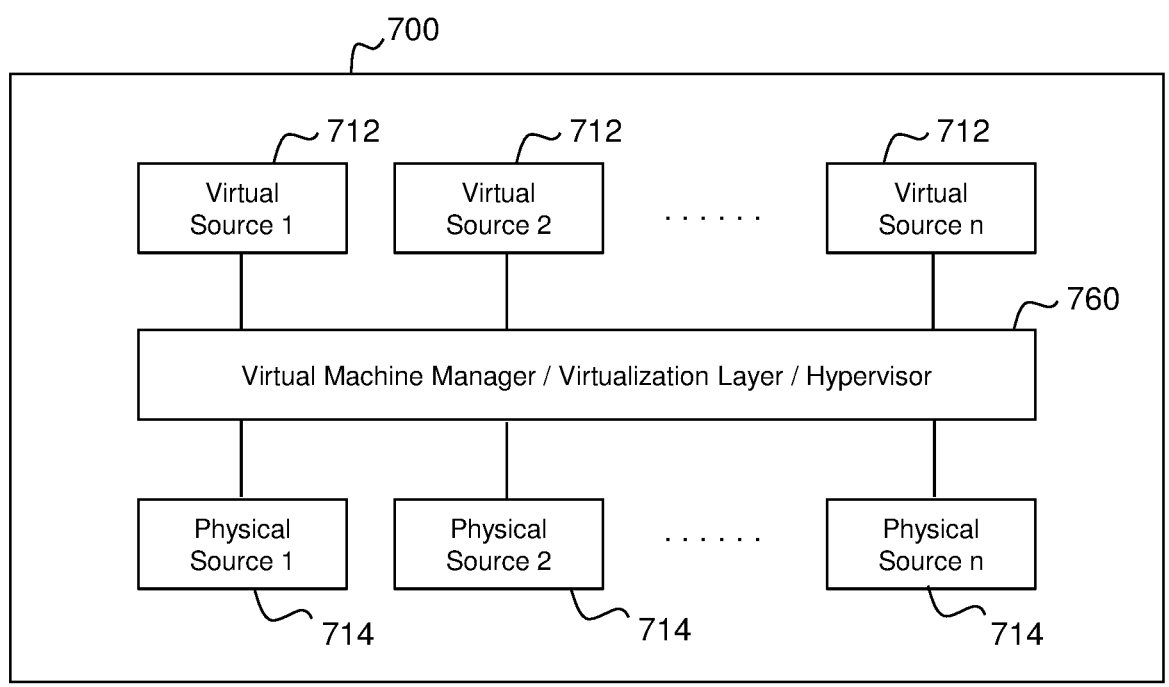
FIG. 7 is a block diagram illustrating a virtually managed random distribution system in communication with multiple virtual and physical entropy sources according to aspects of the present invention.

FIG. 7 is a block diagram illustrating an example RaaS system 700 including one or more virtual sources 712 of random bit streams, numbers, sequences, etc. managed by a virtual machine manager, virtualization layer, and/or hypervisor 760. The RaaS system 700 can additionally include one or more physical sources 714 of random bit streams, numbers, sequences, etc. The virtual sources 712 and/or hypervisor 760 can reside in a cloud host. The hypervisor 760 can emulate some or all of the virtual sources 712 and/or associated RaaS node of each virtual source. In some examples, physical random distribution service resources 714 can be separately pooled from a hybrid of public and private datacenter resources. Physical sources 714 can be isolated by the hypervisor 760 and have the appearance of interacting with a physical machine.

In some examples, virtual sources 712 can be fed by the physical sources 714. In an example implementation, each virtual source 712 can sample a random output (e.g. bit stream or random number sequence) of a sub-combination or all of the physical sources 714 and combine the sampled random outputs into a new random output. In an example implementation, a first virtual source 712 can sample a first pair of physical sources 714, pulling some bits from each physical source in the pair and combining the pulled bits to create a new quantum random bit stream different from either of the bit streams from either source in the pair; and a second virtual source 712 can sample a second pair of physical sources 714 that are different from the first pair of physical sources 714, the second virtual source 712 pulling some bits from each physical source 714 in the second pair of physical sources and combining the pulled bits to create a new quantum bit stream different from the physical sources 714 and the output of the first virtual source 712. In another example implementation, a virtual source 712 can sample from some combination of physical sources 714, combine the sampled bits or numbers, and then transform the sampled bits or numbers with a bit stream or random number stream output of one of the sampled physical sources 714 or an additional, non-sampled physical source 714. As will be appreciated and understood by a person of ordinary skill in the art, the number of virtual sources 712 that can be generated grows exponentially as physical sources 714 are added to the system 700. Utilizing virtualized sources 712 therefore can facilitate the generation of a large amount of random output without having to add a large amount of hardware entropy sources.

Multiple RaaS systems 100, 300, 500, 700 can distribute random number sequences as above and can be combined within the system or externally to generate new and unique combinations of identifiable truly random number sequences. The lineage of these daughter sequences can be repackaged with a new identifier or they can be obfuscated and anonymized, so the true source of the random sequence is unknown to third parties. This obfuscation and anonymization can add an additional level of security, for example, to attack on a cryptographic key using the random number sequence. Because the bad actor does not know how the random numbers are generated, the system can be resistant to tampering (e.g. seeding) to influence the key. As noted above, the operations can include receiving random numbers in blocks or streams from a software component in this distributed computing environment. The random numbers can be further decoupled from the computer system and hardware through software.

Random number sequences can be managed for single use or reuse by a RaaS system such as the example systems 100, 300, 500, 700 presented herein, an end user system such as the example end user systems 20, 22, 24 presented herein, an external network such as the example external networks 470, 534, 532, 544 presented herein, combinations thereof, and/or variations thereof. In some examples, a RaaS system, an external network, and an end user system can each have their own management scheme for single use or reuse of random number sequences. Management schemes can be coordinated among the systems/networks, or each system/network can have a reuse management scheme that is hidden from the other systems/networks.

In some examples, a RaaS system, external network, and/or end user system can include a cache or memory store containing random number sequences that can be accessed based on a request from an end user system or external network; the system/network can monitor when a portion of memory containing a random number sequence has been accessed and overwrite the accessed random number sequence so that the accessed random number sequence is accessed only once, accessed a predetermined number of times, or accessed within a time limit.

In some examples, a use indicator can be included in a tagged random number sequence within a header, parameter, or other tag. The use indicator can be generated by a RaaS system, by an end user system, or an external network. The use indicator can include information as to the intended number of reuses, actual number of reuses, and/or a temporal expiration. When generated by the RaaS system, some tagged random number sequences can each include a use indicator, and the tagged random number sequences can be aggregated and distributed according to information in the use indicator. In some implementations, reusable random number sequences can be provided at a lower financial cost compared to single use random numbers, which can be desirable in non-cryptographic (e.g. experimental) applications or non-critical encryptions.

The descriptions contained herein are examples of embodiments of the invention and are not intended in any way to limit the scope of the invention. As described herein, the invention contemplates many variations and modifications of a RaaS provider system, including alternative arrangements of functional blocks, additional and/or alternative functional blocks, alternative tagging and aggregation schemes, additional caching, additional control functionality, additional communication functionality, additional functionality to meet end user needs not specifically described herein, additional and/or alternative random number sources, additional and/or alternative schemes and means for generating random bit streams, additional and/or alternative schemes for encrypting and/or encapsulating random numbers for secure transfer over an unsecure network, additional and/or alternative schemes for creating virtual entropy sources, etc. These modifications would be apparent to those having ordinary skill in the art to which this invention relates and are intended to be within the scope of the claims which follow.

The invention claimed is:

1. A method comprising:
   obtaining, by a computational system, a first plurality of random number sequences based at least in part on a first electrical signal from a first entropy source and obtaining a second plurality of random number sequences based at least in part on a second electrical signal from a second entropy source;
   generating, by the computational system, a first plurality of identifiers, each of the first plurality of identifiers indicative of the first entropy source and generating a second plurality of identifiers each indicative of the second entropy source;
   assigning, by the computational system, each identifier of the first plurality of identifiers to a respective random number sequence of the first plurality of random number sequences and assigning each identifier of the second plurality of identifiers to a respective random number sequence of the second plurality of random number sequences; and
   distributing, by the computational system, to an external computing network, the first plurality of random number sequences, the first plurality of identifiers, the second plurality of random number sequences, and the second plurality of identifiers.

2. The method of claim 1 further comprising:
   aggregating, by the computational system, one or more random number sequences of the first plurality of random number sequences and one or more assigned identifiers of the first plurality of identifiers in a first aggregation pool; and
   aggregating, by the computational system, one or more random number sequences of the second plurality of random number sequences and one or more assigned identifiers of the second plurality of identifiers in a second aggregation pool.

3. The method of claim 1 further comprising:
   transforming, by the computational system, each random number sequence of the first plurality of random number sequences thereby generating a first plurality of transformed random number sequences and transforming each random number sequence of the second plurality of random number sequences thereby generating a second plurality of transformed random number sequences,
     wherein the step of distributing, by the computational system, the first plurality of random number sequences, the first plurality of identifiers, the second plurality of random number sequences, and the second plurality of identifiers to the external computing network comprises distributing the first plurality of random number sequences as transformed random number sequences of the first plurality of random number sequences, and distributing the second plurality of random number sequences as transformed random number sequences of the second plurality of transformed random number sequences.

4. The method of claim 1 further comprising:
receiving, from the external computing network, by the computational system, a request for a random number sequence originating from the first entropy source; and
providing, by the computational system, to the external computing network, in response to the request, a random number sequence of the first plurality of random number sequences associated with an identifier of the first plurality of identifiers, the identifier associated with the first entropy source.

5. The method of claim 1 further comprising:
storing, by the computational system, a random number sequence of the first plurality of random number sequences; and
overwriting, by the computational system, the stored random number sequence after distributing the random number sequence only once to the external computing network.

6. An entropy delivery system comprising:
a computational system comprising an input configured to receive a first electrical signal based on a first physical process of a first entropy source and to receive a second electrical signal based on a second physical process of a second entropy source, an output operational to communicate with an external network, a processor, and computer readable medium with instructions thereon that when performed by the processor, causes the processor to perform the steps of:
generating a first identifier and a first random number sequence based on the first electrical signal, the first identifier comprising data indicative of the first entropy source,
generating a second identifier and a second random number sequence based on the second electrical signal, the second identifier comprising data indicative of the second entropy source, and
providing a communication signal representative of the first identifier, the first random number sequence, the second identifier, and the second random number sequence to the output of the computational system.

7. The entropy delivery system of claim 6, wherein the computer readable medium of the computational system further comprises instructions thereon that when performed by the processor, causes the processor performs to perform the steps of:
aggregating the first random number sequence and the first identifier in a first aggregation pool together with one or more additional random number sequences; and
aggregating the second random number sequence and the second identifier in a second aggregation pool together with one or more additional random number sequences.

8. The entropy delivery system of claim 6, wherein the computer readable medium of the computational system further comprises instructions thereon that when performed by the processor, causes the processor to perform the steps of:
generating a first tag comprising the first identifier;
generating a second tag comprising the second identifier;
concatenating the first tag with the first random number sequence to generate a first tagged random number sequence; and
concatenating the second tag with the second random number sequence to generate a second tagged random number sequence,
wherein the communication signal is representative of the first tagged random number sequence and the second tagged random number sequence.

9. The entropy delivery system of claim 8, wherein the computer readable medium of the computational system further comprises instructions thereon that when performed by the processor, causes the processor to perform the steps of:
generating a first aggregation header; and
concatenating the first aggregation header with the first tagged random number sequence and the second tagged random number sequence to generate an aggregation sequence,
wherein the communication signal is representative of the aggregated sequence.

10. The entropy delivery system of claim 6, wherein the computer readable medium of the computational system further comprises instructions thereon that when performed by the processor, causes the processor to perform the steps of:
transforming the first random number sequence thereby generating a first transformed random number sequence; and
transforming the second random number sequence thereby generating a second transformed random number sequence,
wherein the communication signal is representative of the first transformed random number sequence and the second transformed random number sequence.

11. The entropy delivery system of claim 6, further comprising:
a first memory store in communication with the computational system,
wherein the computer readable medium of the computational system further comprises instructions thereon that when performed by the processor, causes the processor to perform the steps of:
generating the first identifier and the second identifier based on data stored in the first memory store; and
storing the first identifier and the second identifier in the first memory store.

12. The entropy delivery system of claim 6, further comprising:
a router; and
an out of band management system comprising a first entropy appliance comprising the first entropy source, wherein the input of the computational system is in communication with the output of the first entropy appliance through the router.

13. A distributed computing environment comprising:
a random distribution service engine comprising an input operational to receive a plurality of electrical signals from a plurality of entropy sources, a first processor, and a first computer readable medium in communication with the first processor; and
a control system in communication with the random distribution service engine and comprising an output operational to communicate with an external network, a second processor, and a second computer readable medium in communication with the first processor,
wherein the first computer readable medium of the random distribution service engine comprises instructions thereon that when executed by the first processor, causes the first processor to perform the steps of:
differentiating each electrical signal of the plurality of electrical signals as originating from a unique entropy source of a plurality of entropy sources, and
generating a plurality of tagged random number sequences each comprising a random number and a tag, the random number being computer readable representation of a differentiated electrical signal of the plurality of electrical signals and the tag comprising data indicative of the unique entropy source from which the differentiated electrical signal originates, and wherein the second computer readable medium of the control system comprises instructions thereon that when executed by the second processor, causes the second processor to perform the steps of:

receiving, from the external network, a first request for a random number sequence from a specific entropy source, transmitting, to the random distribution service engine, in response to the first request, executable instructions that when executed by the first processor of the random distribution service engine, cause the first processor to provide a requested tagged random number sequence, the requested tagged random number sequence being a tagged random number sequence of the plurality of tagged random number sequences comprising a tag with data indicative of the specific entropy source, receiving, from the random distribution service engine, the requested tagged random number sequence, and transmitting, to the external network, the requested tagged random number sequence.

14. The distributed computing environment of claim 13, wherein the first computer readable medium of the random distribution service engine comprises instructions thereon that when executed by the first processor, causes the first processor to perform the steps of:

generating a plurality of aggregation headers each comprising data indicative of a combination at least a portion of the plurality of tagged random number sequences, and generating a plurality of aggregated sequences, each sequence comprising a concatenation of an aggregation header of the plurality of aggregation headers and each tagged random number sequence of the combination of the at least a portion of the plurality of tagged random number sequences of which the aggregation header is indicative, wherein the second computer readable medium of the control system comprises instructions thereon that when executed by the second processor, the second processor performs the steps of:

receiving, from the external network, a second request for a specific combination of random number sequences, transmitting, to the random distribution service engine, in response to the second request, executable instructions that when executed by the first processor of the random distribution service engine, cause the first processor to provide a requested aggregated sequence, the requested aggregated sequence being an aggregated sequence of the plurality of aggregated sequences comprising an aggregation header comprising data indicative of the specific combination of random number sequences, receiving, from the random distribution service engine, the requested aggregated sequence, and transmitting, to the external network, the requested aggregated sequence.

15. The distributed computing environment of claim 13 further comprising:

a quantum entropy source of the plurality of entropy sources, the quantum entropy source providing an electrical signal of the plurality of electrical signals to the random distribution service engine.

16. An entropy system node comprising:

an entropy source providing an electrical signal representative of a physical entropy process;

an entropy interface providing a random bit stream based at least in part on the electrical signal;

an identifier engine providing a tagged random number sequence based at least in part on the random bit stream and comprising information indicative of the entropy source; and a distribution engine in communication with an external network and providing a verifiable random number sequence based at least in part on the tagged random number sequence to the external network.

17. The entropy system node of claim 16, wherein the entropy system node is a portable electronic device.

18. The entropy system node of claim 16, wherein the entropy system node is one of a cellular telephone, a tablet computer, and a laptop computer.

19. The entropy system node of claim 16 further comprising:

an aggregator engine providing an aggregated random number sequence comprising the tagged random number sequence and one or more additional random number sequences, wherein the verifiable random number sequence is based at least in part on the aggregated random number sequence.

20. The entropy system node of claim 16, wherein the entropy system node is in communication with a second entropy system node through the external network, and wherein the second entropy system node comprises a second entropy source.

* * * * *